US011483818B2

United States Patent
Niu et al.

(10) Patent No.: US 11,483,818 B2
(45) Date of Patent: Oct. 25, 2022

(54) TIME-DOMAIN TRANSMISSION SCHEDULING

(71) Applicant: ZTE Corporation, Guangdong (CN)

(72) Inventors: Li Niu, Guangdong (CN); Zhongda Du, Guangdong (CN); Yajun Zhao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 140 days.

(21) Appl. No.: 16/911,380

(22) Filed: Jun. 24, 2020

(65) Prior Publication Data

US 2020/0337031 A1    Oct. 22, 2020

Related U.S. Application Data

(63) Continuation of application No. PCT/CN2017/118176, filed on Dec. 25, 2017.

(51) Int. Cl.
*H04W 72/04* (2009.01)
*H04L 1/18* (2006.01)

(52) U.S. Cl.
CPC ......... *H04W 72/042* (2013.01); *H04L 1/1812* (2013.01)

(58) Field of Classification Search
CPC .............. H04L 1/1812; H04W 72/042; H04W 72/0446
USPC ....................................... 370/329
See application file for complete search history.

(56) References Cited

U.S. PATENT DOCUMENTS

| 2015/0319701 | A1* | 11/2015 | Ng | H04L 5/005 370/311 |
| 2016/0227428 | A1 | 8/2016 | Novlan et al. | |
| 2017/0181155 | A1 | 6/2017 | Chen et al. | |
| 2018/0270713 | A1* | 9/2018 | Park | H04W 74/0833 |
| 2019/0068343 | A1* | 2/2019 | Kwak | H04L 5/005 |

OTHER PUBLICATIONS

Catt, "On Remaining details on RMSI," 3GPP TSG-RAN WG1 Meeting #91, Reno, Nevada, USA, R1-1720170, 20 pages, Dec. 2017.
International Search Report and Written Opinion dated Sep. 13, 2018 for International Application No. PCT/CN2017/118176, filed on Dec. 25, 2017 (6 pages).

* cited by examiner

*Primary Examiner* — Christopher M Crutchfield
*Assistant Examiner* — Jean F Voltaire
(74) *Attorney, Agent, or Firm* — Perkins Coie LLP (57) ABSTRACT

Methods, systems, and devices related to time-domain transmission scheduling for user equipment that is capable of operating in dual connections are described. In one exemplary aspect, a method for wireless communication is described. The method includes receiving, at a wireless device, information indicating a time-domain transmission pattern, determining a periodic transmission pattern based on the time-domain transmission pattern and an offset of the wireless device, and transmitting data, to the communication node, according to the periodic transmission pattern.

18 Claims, 6 Drawing Sheets

TIME-DOMAIN TRANSMISSION SCHEDULING

CROSS REFERENCE TO RELATED APPLICATIONS

This patent document is a continuation of and claims benefit of priority to International Patent Application No. PCT/CN2017/118176, filed on Dec. 25, 2017. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communication, and more specifically, to techniques related to time-domain transmission scheduling for user equipment (UE).

In one exemplary aspect, a method for wireless communication is disclosed. The method includes receiving, at a wireless device, information indicating a time-domain transmission pattern; determining a periodic transmission pattern based on the time-domain transmission pattern and an offset; and transmitting data, to the communication node, according to the periodic transmission pattern.

In some embodiments, the periodic transmission pattern is a semi-persistent transmission pattern. In some embodiments, the offset is a subframe offset, a HARQ offset, or a time offset.

In some embodiments, a time-domain position of an initial semi-persistent grant of the semi-persistent transmission pattern is determined based on the time-domain transmission pattern and the offset. In some implementations, the information indicating the time-domain transmission pattern is in a Radio Resource Control (RRC) message.

In some embodiments, the method also includes receiving, at the wireless device, the offset in a Radio Resource Control (RRC) message. Alternatively, the method includes receiving, at the wireless device, a message including the offset via the Physical Downlink Control Channel (PDCCH) or Enhanced PDCCH (EPDCCH).

In another exemplary aspect, a method for wireless communication is disclosed. The method includes transmitting, to a wireless device, information indicating a time-domain transmission pattern; and receiving data from the wireless device according to a periodic transmission pattern, wherein the periodic transmission pattern is determined based on the transmission pattern and an offset.

In some embodiments, the periodic transmission pattern is a semi-persistent transmission pattern. In some embodiments, the offset of the wireless device is a subframe offset or a HARQ offset or a time offset.

In some embodiments, a time-domain position of an initial semi-persistent grant of the semi-persistent transmission pattern is determined based on the time-domain transmission pattern and the offset. In some implementations, the information indicating the time-domain transmission pattern is in a Radio Resource Control (RRC) message.

In some embodiments, the method also includes transmitting, to the wireless device, the offset of the wireless device in a Radio Resource Control (RRC) message. Alternatively, the method can include transmitting, to the wireless device, a message including the offset via the Physical Downlink Control Channel (PDCCH) or Enhanced PDCCH (EPDCCH).

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

With the continuous development of wireless communication technologies, a wide range of wireless communication services are emerging, which will greatly increase the demand for bandwidth in wireless communication systems. The development of the new generation of wireless communication—5G New Radio (NR) communication—is a part of an ongoing mobile broadband evolution process to meet the requirements of increasing network demand. NR will provide greater throughput to allow more users to connect at the same time. Aspects such as energy consumption, device cost, spectral efficiency, and latency are important to meeting the needs of various communication scenarios. For example, the traditional frequency range of 300 MHz to 3 GHz may not satisfy high throughput requirements for modern wireless communication systems. The NR communication systems are capable of operating at a frequency range over 3 GHz, even up to 100 GHz, thereby supporting high data rates with higher bandwidths.

Figure 1:
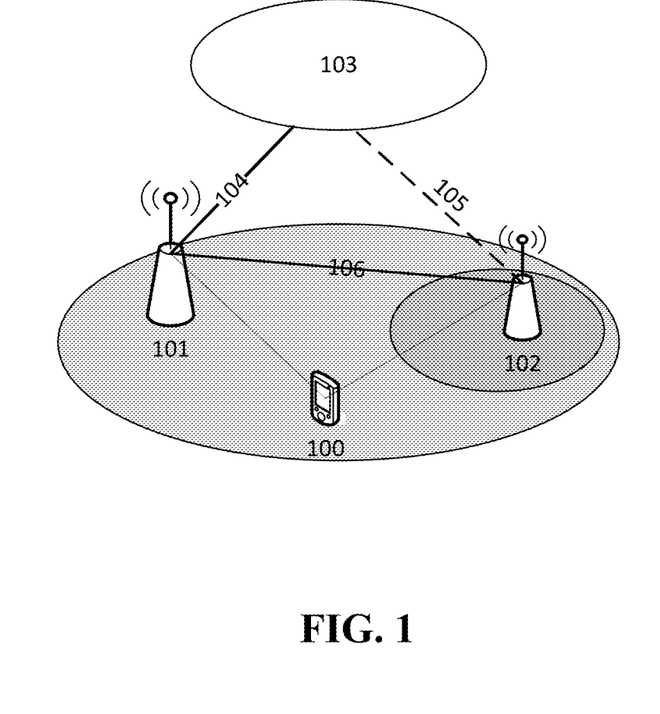
FIG. 1 shows an exemplary schematic diagram of a system architecture for Dual Connectivity (DC).

As NR emerges in the wireless technology area, UEs will be capable of supporting existing protocols (e.g., Long Term Evolution (LTE)) as well as NR at the same time. FIG. 1 shows an exemplary schematic diagram of a system architecture for Dual Connectivity (DC). DC refers to, for example, a system configuration, or a mode of operation of a wireless device, in which user devices may operate with two logically separate communication connections to the network. The current base station (referred to as the first network element 101) coupled to the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane.

On the wired interface side (e.g., backhaul connections), the first network element 101 and the core network 103 establish one or more interfaces 104 for the UE 100 (e.g., a control plane interface and a user plane interface). The second network element 102 and the core network 103 may establish one or more interfaces 105 for the UE 100 (e.g., a control plane interface and a user plane interface). An interface 106 (e.g., Xn interface) inter-connects the two network elements.

On the wireless interface side, the first and the second network elements (101 and 102) may provide radio resources using the same or different Radio Access Technologies (RATs). Each of the network element can schedule transmissions with the UE 100 independently. The network element that has a control plane connection and a user plane connection to the core network is referred to as the master node (e.g., the first network element 101), and the network element that has only a user plane connection with the core network is referred to as the secondary node (e.g., the second network element 102). In some cases, the UE 100 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN). In each of the dual connection scenarios, one network (e.g., LTE network) is responsible for resolving coverage, while the other (e.g., NR network) is responsible for improving throughput.

Figure 2:
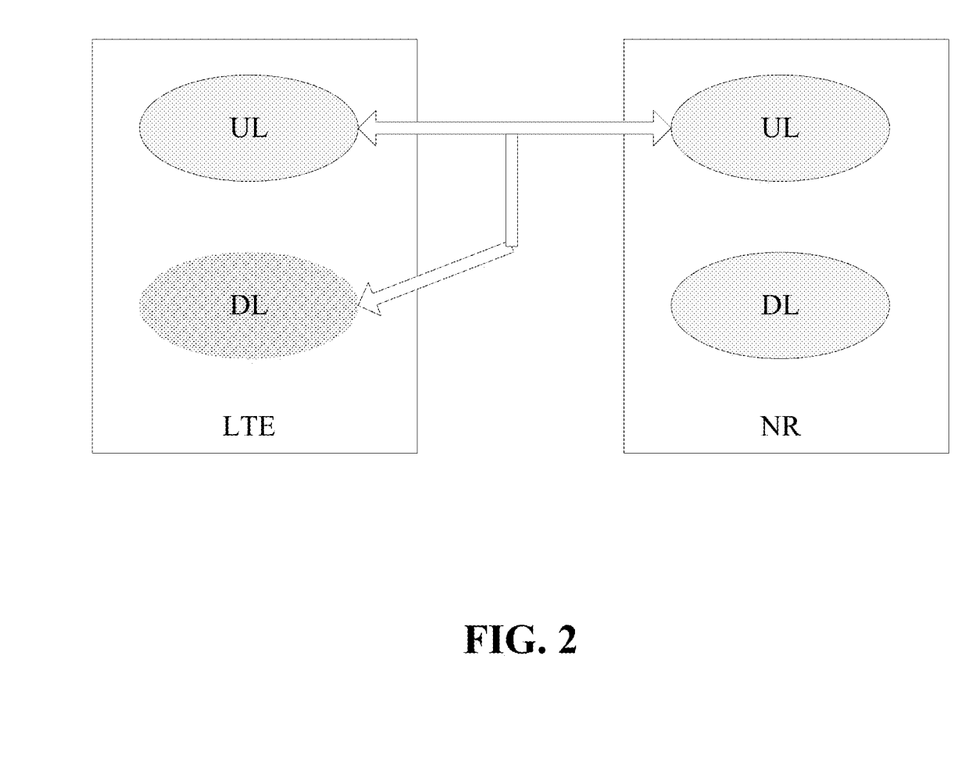
FIG. 2 shows a schematic diagram of intermodulation interference caused by Long Term Evolution-New Radio (LTE-NR) dual connections.

While dual connection configurations can improve data rate, some interference may appear due to different frequency ranges that each node operates in. FIG. 2 shows a schematic diagram of intermodulation interference caused by LTE-NR dual connections. A UE (not shown) is configured with both LTE and NR connections. The LTE connection operates on a lower frequency band and the NR connection operates on a higher frequency band. When the UE transmits data using both connections, there can be inter-modulation interferences due to the LTE-NR coexistence. This kind of interference comes from the intermodulation (IM) product between LTE and NR uplink carriers which may fall into the LTE downlink carrier. For example, when the UE transmits simultaneously using LTE B3 band (1800 MHz) and NR sub-6G band, IM2/4/5 can fall into the LTE receiver operating in LTE B1 band (2100 MHz).

Figure 3:
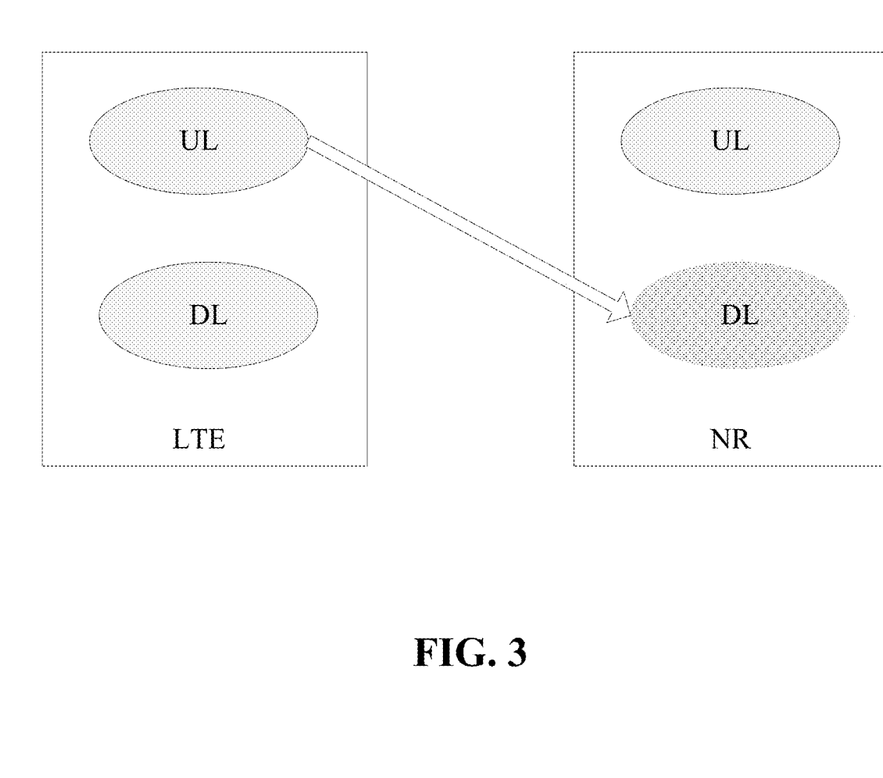
FIG. 3 shows a schematic diagram of harmonic interference caused by LTE-NR dual connections.

FIG. 3 shows a schematic diagram of harmonic interference caused by LTE-NR dual connections. A UE (not shown) is configured with both LTE and NR connections. The LTE connection operates on a lower frequency band and the NR connection operates on a higher frequency band. When the UE transmits data using both connections, there can also be harmonic interferences due to the LTE-NR coexistence. This kind of interference comes from the harmonic of lower band LTE uplink signals to the NR downlink signals when the harmonic of LTE uplink frequency falls into NR downlink frequency. For example, when the UE transmits simultaneously using LTE B3 band (1800 MHz) and NR sub-6G band, interference from harmonics H2 of LTE B3 band (1800 MHz) can fall into the NR receiver.

In some embodiments, a Time Division Multiplexing (TDM) transmission scheme can be used to reduce and/or minimize the interference caused by dual connectivity. For example, the master node and the secondary node can coordinate a TDM transmission pattern for UEs such that, if the master node decides to reserve resources for uplink scheduling for a UE, the secondary node can avoid using the same resources for uplink/downlink scheduling for the same UE. Periodic transmission scheduling, such as the Semi-Persistent Scheduling (SPS), can be scheduled according to the TDM transmission scheme.

The Semi-Persistent Scheduling (SPS) allows periodic assignment of resources to a specific UE. However, collisions can happen between new transmission and retransmission using such periodic scheduling. For example, when the round trip time (RTT) is 10 ms and the SPS interval is 20 ms, the new transmission may collide with the second re-transmission. A subframe offset applicable to UE may be introduced to address this problem. For example, if two-interval resolution is enabled by an upper layer, the UE considers sequentially that the $N_{th}$ grant for SPS occurs in the subframe for which:

$$(10*SFN+\text{subframe})=[(10*SFN_{start\ time}+\text{subframe}_{start\ time})+N*\text{semiPersistSchedIntervalUL}+\text{Subframe\_Offset}*(N\ \text{modulo}\ 2)] \ \text{modulo}\ 10240.$$

Here, $SFN_{start\ time}$ and $\text{subframe}_{start\ time}$ are the system frame number and subframe at the time the configured uplink grant is initialized or re-initialized. The subframe offset values for different Time-Division Duplexing (TDD) uplink (UL)/downlink (DL) configurations are shown in Table 1.

TABLE 1

Exemplary Subframe Offset Values for TDD UL/DL Configurations

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | -1 |
| 2 | Subframe 2 | 5 |
|   | Subframe 7 | -5 |
| 3 | Subframes 2 and 3 | 1 |
|   | Subframe 4 | -2 |
| 4 | Subframe 2 | 1 |
|   | Subframe 3 | -1 |
| 5 | N/A | 0 |
| 6 | N/A | 0 |

The techniques described in the present document can be used in a Time Division Multiplexing (TDM) transmission scheme that uses an offset. This offset can be a UE-specific offset, such as a subframe offset, a HARQ offset, or a time offset. The offset may also be in the unit of millisecond.

The TDM transmission scheme can be used for UEs that operate in dual connectivity mode. For example, the master node and the secondary node first coordinate a TDM transmission pattern. The master code informs a UE of the TDM transmission pattern along with an offset. When the UE performs uplink transmissions using the TDM transmission pattern with the offset, interference caused by dual connectivity can be minimized, and the likelihood of collisions between new transmission and retransmission is greatly reduced.

The TDM transmission scheme can also be used for UEs that operate in other modes (e.g., single connectivity mode or multi-connectivity mode), so long as the corresponding base station adopts a TDM transmission pattern for uplink transmissions. The base station can inform a UE of the TDM transmission pattern that it uses, along with an offset. When the UE performs uplink transmissions using the TDM transmission pattern with the offset, interference can be minimized and the likelihood of collisions between new transmission and retransmission is greatly reduced.

Details of the techniques are further described in the following embodiments. While LTE and NR protocols are used as examples for enhancing understanding, the described techniques may be embodied in other wireless systems as well, including systems configured for operating in the single-connection, dual-connection, or multi-connection mode.

Example Embodiment 1

Referring to FIG. 2, intermodulation interference can be introduced when the UE transmits data using dual connections. In order to reduce and/or avoid such intermodulation interference, the UE can transmit uplink signals towards the master and secondary nodes at different times using a TDM transmission pattern. The master node (e.g., LTE node) and the secondary node (e.g., NR node) can coordinate a TDM transmission pattern for a UE over an interface (e.g., X2/Xn). If the master node decides to reserve resources for uplink scheduling for the UE, the secondary node can avoid using the same resources for uplink scheduling for the same UE.

In some cases, the acknowledgements for the Physical Uplink Control Channel (PUCCH) are limited in some uplink subframes. When a node operates using the Frequency Division Duplexing (FDD) scheme, transmission on the Physical Downlink Shared Channel (PDSCH) is also limited in corresponding downlink subframes based on the timing between Hybrid Automatic Repeat reQuest (HARQ) feedback and PDSCH, Such limitations can cause throughput degradation in downlink channels, thus it is desirable to adopt the DL-reference UL/DL configurations defined in LTE-TDD-FDD Carrier Aggregation (CA) for the primary cell. For example, Table 2 shows that multiple HARQ feedback from downlink subframe can be sent in an uplink subframe.

TABLE 2

Multiple HARQ feedback in uplink subframes

| DL-reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8,7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

Furthermore, each UE can form a different transmission pattern using an offset. In some embodiments, the offset can be UE specific. For example, the offset can be UE-specific HARQ offset. The start time of a semi-persistent grant can be configured in the reserved uplink subframes. Thus, the position of initial semi-persistent grant (as shown in Table 1) can be shifted by the offset. Table 3 shows examples of the shifted initial Semi-Persistent grants using the offset. Using such shifted semi-persistent grants, the likelihood of data collision can be greatly reduced.

TABLE 3

Exemplary Initial Semi-Persistent Grants Shifted by an Offset

| DL-reference UL/DL Configuration | Position of initial Semi-Persistent grant | Subframe_Offset value (ms) |
|---|---|---|
| 0 | N/A | 0 |
| 1 | Subframes ((2 + Offset) %10) and ((7 + Offset) %10) | 1 |
| | Subframes ((3 + Offset) %10) and ((8 + Offset) %10) | −1 |
| 2 | Subframes (2 + Offset) %10 | 5 |
| | Subframes (7 + Offset) %10 | −5 |
| 3 | Subframes ((2 + Offset) %10) and ((3 + Offset) %10) | 1 |
| | Subframes (4 + Offset) %10 | −2 |
| 4 | Subframes (2 + Offset) %10 | 1 |
| | Subframes (3 + Offset) %10 | −1 |
| 5 | N/A | 0 |
| 6 | N/A | 0 |

In some embodiments, after the master node and the secondary node coordinate a TDM transmission pattern, the master node informs the UE of the TDM transmission scheme by indicating a UL/DL configuration and an offset. For example, the master node may send the UL/DL configuration via a Radio Resource Control (RRC) message.

The UE may obtain the offset via a RRC message or the Physical Downlink Control Channel (PDCCH) or Enhanced PDCCH (EPDCCH). In some embodiments, the PDCCH or EPDCCH can carry an SPS activation command. In this particular example, the offset can be an integer value in the range of 0-9. The UE then performs uplink transmission based on the shifted semi-persistent grants.

Example Embodiment 2

Referring to FIG. 3, harmonic interference can be introduced when the UE transmits data using dual connections. In order to reduce and/or avoid such harmonic interference, the UE can transmit uplink signals towards the master and secondary nodes at different times using a TDM transmission pattern. The master node (e.g., LTE node) and the secondary node (e.g., NR node) can coordinate a TDM transmission pattern for a UE over an interface (e.g., X2/Xn). If the master node decides to reserve resources for uplink scheduling for the UE, the secondary node can avoid using the same resources for uplink scheduling for the same UE.

As discussed above, in some implementations, it is desirable to adopt UL/DL configurations for indicating the TDM transmission scheme. The master node informs the UE of the TDM transmission scheme using a UL/DL configuration and a offset. In some embodiments, the offset can be UE specific, such as a UE-specific HARQ offset. The master node may send such information via a Radio Resource Control (RRC) message. The UE may obtain the offset via a RRC message or the Physical Downlink Control Channel (PDCCH) or the Enhanced PDCCH (EPDCCH). In some embodiments, the PDCCH or EPDCCH can be carry an SPS activation command. In this particular embodiment, the offset can be an integer value in the range of 0-9. The uplink SPS pattern can be shifted by the offset, such as shown in Table 3. The UE then performs uplink transmission based on the shifted semi-persistent grants.

Example Embodiment 3

Referring to FIG. 2, intermodulation interference can be introduced when the UE transmits data using dual connections. In order to reduce and/or avoid such intermodulation interference, the UE can transmit uplink signals towards the master and secondary nodes at different times using a TDM transmission pattern. The master node (e.g., LTE node) and the secondary node (e.g., NR node) can coordinate a TDM transmission pattern for UEs over an interface (e.g., X2/Xn). If the master node decides to reserve resources for uplink scheduling for the UE, the secondary node can avoid using the same resources for uplink scheduling for the same UE.

In this particular embodiment, the master node informs the UE of the TDM transmission pattern directly. In some embodiments, the offset can be UE specific, such as a UE-specific time offset or a cell-level time offset. For example, the master node may include, in a RRC message, an indicator indicating a TDM transmission pattern. The UE may obtain the offset via a RRC message or the Physical Downlink Control Channel (PDCCH) or the Enhanced PDCCH (EPDCCH). In some embodiments, the PDCCH or EPDCCH can carry an SPS activation command. In this particular embodiment, the range of offset is 0~9. The uplink SPS pattern can be shifted by the UE specific subframe offset, such as shown in Table 3. The UE then performs uplink transmission based on the shifted semi-persistent grants.

Example Embodiment 4

Referring to FIG. 3, harmonic interference can be introduced when the UE transmits data using dual connections. In order to reduce and/or avoid such harmonic interference, the UE can transmit uplink signals towards the master and secondary nodes at different times using a TDM transmission pattern. The master node (e.g., LTE node) and the secondary node (e.g., NR node) can coordinate a TDM transmission pattern for UEs over an interface (e.g., X2/Xn). If the master node decides to reserve resources for uplink scheduling for the UE, the secondary node can avoid using the same resources for uplink scheduling for the same UE.

In this particular embodiment, the master node informs the UE of the TDM transmission pattern directly. For example, the master node may include, in a RRC message, an indicator indicating a TDM transmission pattern. In some embodiments, the offset can be UE specific, such as a UE-specific time offset or a cell-level time offset. The UE may obtain the offset via a RRC message or the Physical Downlink Control Channel (PDCCH) or Enhanced PDCCH (EPDCCH). In some embodiments, the PDCCH or EPDCCH can carry an SPS activation command. In this particular embodiment, the range of offset is 0~9. The uplink SPS pattern can be shifted by the offset, such as shown in Table 3. The UE then performs uplink transmission based on the shifted semi-persistent grants.

Example Embodiment 5

A wireless node (e.g., an LTE node) maybe subject to intra-frequency interference in uplink transmission from other wireless nodes. In order to reduce and/or avoid such interference, all UEs of the wireless node can transmit uplink signals at different times using a TDM transmission pattern that is different from transmission patterns used by the other wireless nodes. The wireless node (e.g., the LTE node) can determine a TDM transmission pattern over an interface (e.g., X2/Xn). If a wireless node decides to reserve resources for uplink scheduling, the other wireless nodes can avoid using the same resources for uplink scheduling.

In this particular embodiment, the wireless node informs the UEs of the TDM transmission pattern. For example, the wireless node may include, in a RRC message, an indicator indicating the TDM transmission pattern and an offset. The offset can be UE specific, such as a UE-specific time offset or cell level time offset. In some embodiments, the offset can be in the unit of millisecond, such as 1 ms. The UE may obtain the offset via a RRC message or via the Physical Downlink Control Channel (PDCCH) or Enhanced PDCCH (EPDCCH). In some embodiments, the RRC message includes system information and RRC dedicated information. In some implementations, the PDCCH or EPDCCH can carry an SPS activation command. In this particular embodiment, the range of offset is 0~9. The uplink SPS pattern can be shifted by the offset, such as shown in Table 3. The UE then performs uplink transmission based on the shifted semi-persistent grants.

It is noted that while this patent document discusses interferences such as intermodulation interference and harmonic interference, the disclosed techniques can be applied to other types of interference scenarios. It is also noted that while the embodiments describe UE operating in the dual connection mode, the techniques can be applied to other transmission modes so long as the base station uses a TDM transmission pattern for uplink transmissions.

Figure 4:
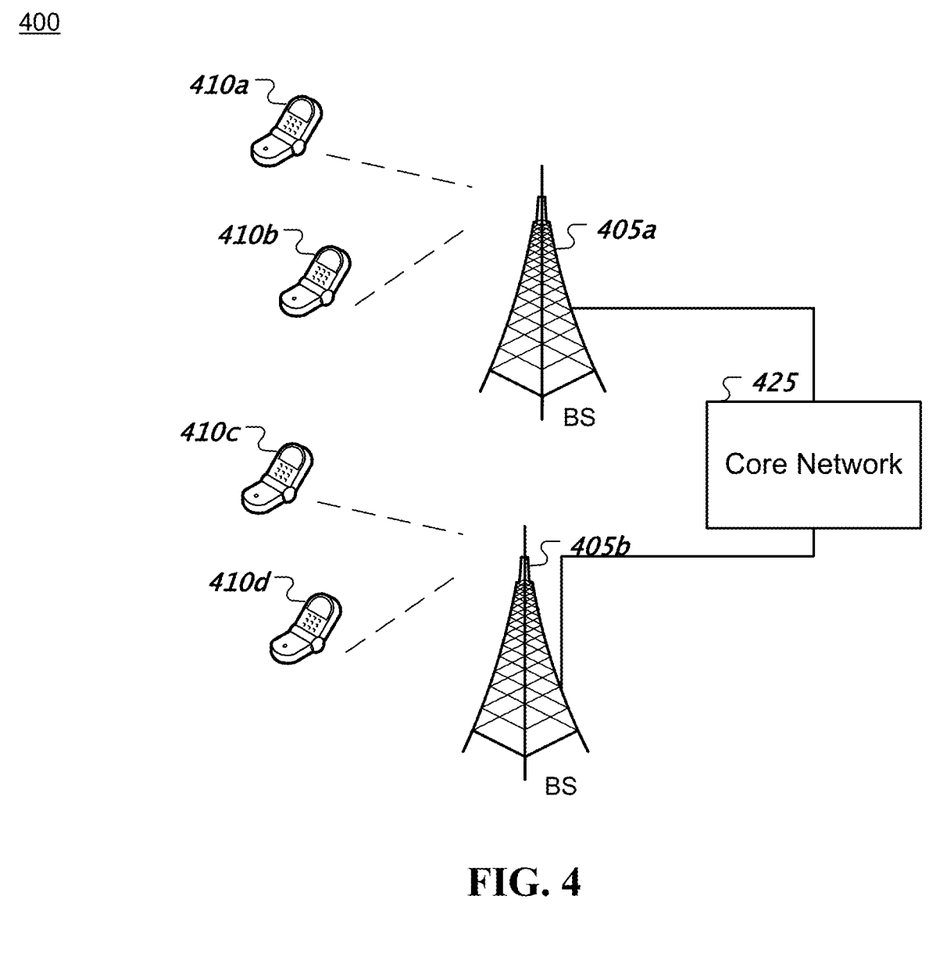
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
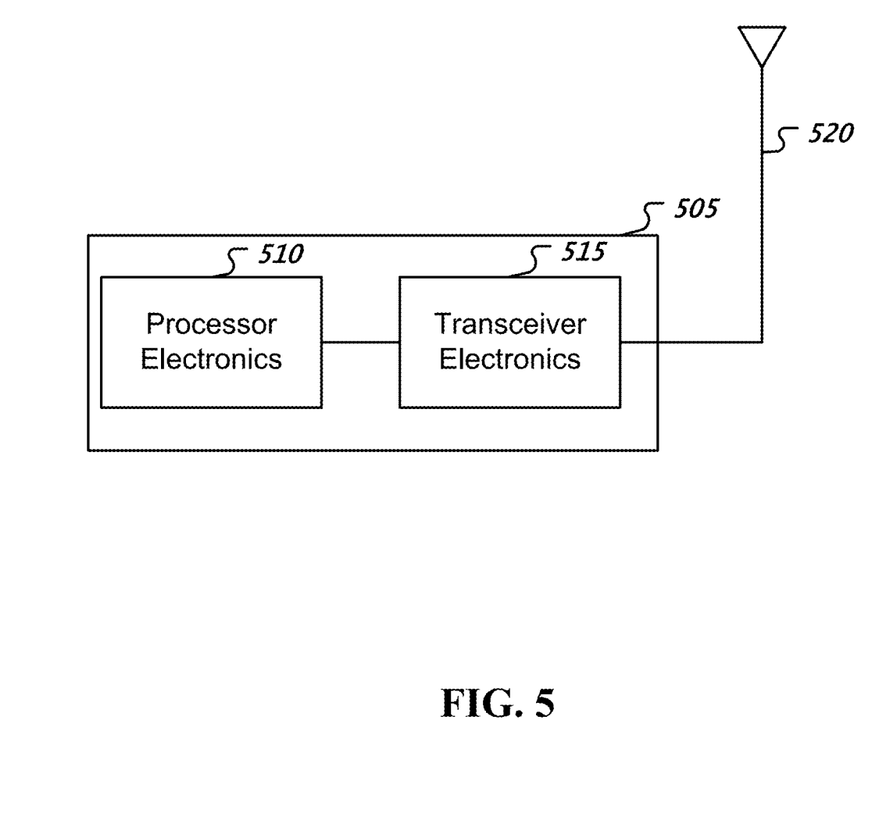
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

Figure 6:
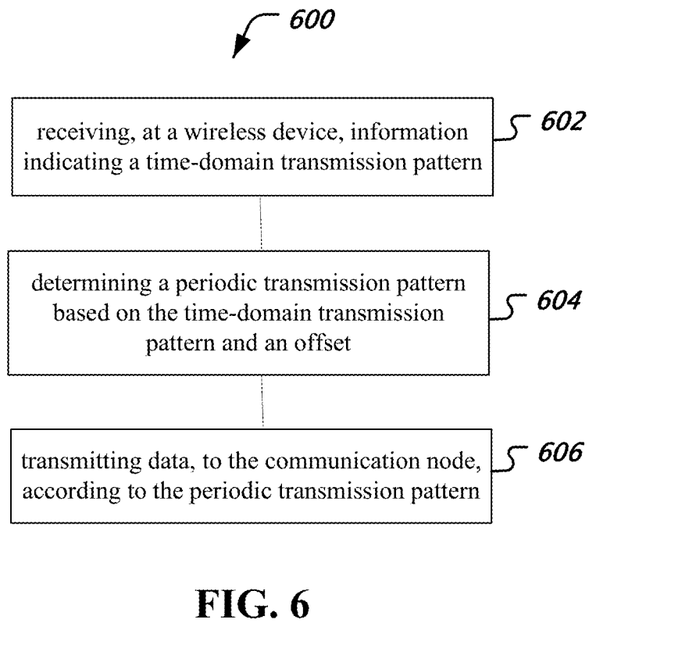
FIG. 6 is a flowchart representation of a method for wireless communication.

FIG. 6 is a flowchart representation of a method 600 for wireless communication. The method 600 includes, at 602, receiving, at a wireless device, information indicating a time-domain transmission pattern. The method 600 includes, at 604, determining a periodic transmission pattern based on the time-domain transmission pattern and a subframe offset of the wireless device. The method 600 further includes, at 606, transmitting data, to the communication node, according to the periodic transmission pattern.

Figure 7:
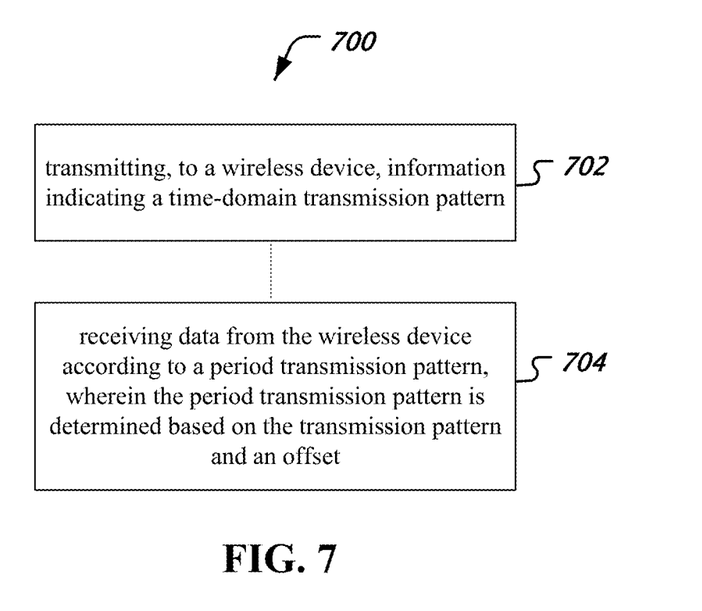
FIG. 7 is a flowchart representation of another method for wireless communication.

FIG. 7 is a flowchart representation of a method 700 for wireless communication. The method 700 includes, at 702, transmitting, to a wireless device, information indicating a time-domain transmission pattern. The method 700 also includes, at 704, receiving data from the wireless device according to a period transmission pattern, wherein the period transmission pattern is determined based on the transmission pattern and a subframe offset of the wireless device.

It is thus evident that techniques related to a Time Division Multiplexing (TDM) transmission scheme are disclosed. In particular, the TDM transmission scheme can be used for UEs when a corresponding communication node adopts a TDM transmission pattern for uplink transmissions. The communication code may inform a UE of the TMD transmission pattern along with an offset. This offset can be a UE-specific offset, such as a subframe offset or a HARQ offset. Each UE can shift an initial grant position of the transmission pattern using the offset to form a different period transmission pattern, thereby minimizing interference and reducing the likelihood of collisions between new transmission and retransmission during periodic transmissions.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
    receiving, at a wireless device, information indicating a time-domain transmission pattern;
    determining a periodic transmission pattern based on the time-domain transmission pattern and an offset of the wireless device, wherein the periodic transmission pattern is a semi-persistent transmission pattern, and wherein a time-domain position of an initial semi-persistent grant of the semi-persistent transmission pattern is determined based on the time-domain transmission pattern and the offset; and
    transmitting data, to a communication node, according to the periodic transmission pattern.

2. The method of claim 1, wherein the offset is a subframe offset, a HARQ offset, or a time offset.

3. The method of claim 1, further comprising:
    receiving, at the wireless device, a message including the offset via a Physical Downlink Control Channel (PDCCH) or Enhanced PDCCH (EPDCCH).

4. A method for wireless communication, comprising:
    transmitting, to a wireless device, information indicating a time-domain transmission pattern; and
    receiving data from the wireless device according to a periodic transmission pattern, wherein the periodic transmission pattern is determined based on the time-domain transmission pattern and an offset of the wireless device, wherein the periodic transmission pattern is a semi-persistent transmission pattern, and wherein a time-domain position of an initial semi-persistent grant of the semi-persistent transmission pattern is determined based on the time-domain transmission pattern and the offset.

5. The method of claim 4, wherein the offset is a subframe offset, a HARQ offset, or a time offset.

6. The method of claim 4, further comprising:
    transmitting, to the wireless device, a message including the offset via a Physical Downlink Control Channel (PDCCH) or Enhanced PDCCH (EPDCCH).

7. An apparatus for wireless communication comprising:
    a processor, and
    a memory including processor executable code, wherein the processor executable code upon execution by the processor configures the processor to:
    receive information indicating a time-domain transmission pattern;
    determine a periodic transmission pattern based on the time-domain transmission pattern and an offset of the apparatus, wherein the periodic transmission pattern is a semi-persistent transmission pattern, and wherein a time-domain position of an initial semi-persistent grant of the semi-persistent transmission pattern is determined based on the time-domain transmission pattern and the offset; and
    transmit data according to the periodic transmission pattern.

8. The apparatus of claim 7, wherein the offset is a subframe offset, a HARQ offset, or a time offset.

9. The apparatus of claim 7, wherein the processor is configured to receive a message including the offset via a Physical Downlink Control Channel (PDCCH) or Enhanced PDCCH (EPDCCH).

10. An apparatus for wireless communication comprising:
    a processor, and
    a memory including processor executable code, wherein the processor executable code upon execution by the processor configures the processor to:
    transmit information indicating a time-domain transmission pattern; and
    receive data from a wireless device according to a periodic transmission pattern, wherein the periodic transmission pattern is determined based on the time-domain transmission pattern and an offset of the wireless device, wherein the periodic transmission pattern is a semi-persistent transmission pattern, and wherein a time-domain position of an initial semi-persistent grant of the semi-persistent transmission pattern is determined based on the time-domain transmission pattern and the offset.

11. The apparatus of claim 10, wherein the offset is a subframe offset, a HARQ offset, or a time offset.

12. The apparatus of claim 10, wherein the processor is configured to transmit a message including the offset via a Physical Downlink Control Channel (PDCCH) or Enhanced PDCCH (EPDCCH).

13. A non-transitory computer readable medium having code stored thereon, the code when executed by a processor, causing the processor to:
receive information indicating a time-domain transmission pattern;
determine a periodic transmission pattern based on the time-domain transmission pattern and an offset of a wireless device, wherein the periodic transmission pattern is a semi-persistent transmission pattern, and wherein a time-domain position of an initial semi-persistent grant of the semi-persistent transmission pattern is determined based on the time-domain transmission pattern and the offset; and
transmit data according to the periodic transmission pattern.

14. The non-transitory computer readable medium of claim 13, wherein the offset is a subframe offset, a HARQ offset, or a time offset.

15. The non-transitory computer readable medium of claim 13, wherein the processor is configured to receive a message including the offset via a Physical Downlink Control Channel (PDCCH) or Enhanced PDCCH (EPDCCH).

16. A non-transitory computer readable medium having code stored thereon, the code when executed by a processor, causing the processor to:
transmit information indicating a time-domain transmission pattern; and
receive data from a wireless device according to a periodic transmission pattern, wherein the periodic transmission pattern is determined based on the time-domain transmission pattern and an offset of the wireless device, wherein the periodic transmission pattern is a semi- persistent transmission pattern, and wherein a time-domain position of an initial semi-persistent grant of the semi-persistent transmission pattern is determined based on the time-domain transmission pattern and the offset.

17. The non-transitory computer readable medium of claim 16, wherein the offset is a subframe offset, a HARQ offset, or a time offset.

18. The non-transitory computer readable medium of claim 16, wherein the processor is configured to transmit a message including the offset via a Physical Downlink Control Channel (PDCCH) or Enhanced PDCCH (EPDCCH).

* * * * *